(12) United States Patent  
Zhang et al.

(10) Patent No.: US 8,516,786 B2  
(45) Date of Patent: Aug. 27, 2013

(54) SYSTEM AND METHOD FOR INJECTION OF COOLING AIR INTO EXHAUST GAS FLOW

(75) Inventors: Hua Zhang, Greer, SC (US); Ajit Sengar, Noida, IN (US); Saravanan Venkataraman Nattanmai, Chennai (IN); Venugopala Durwasula Raju, Kadapa (IN)

(73) Assignee: General Electric Company, Schenectady, NY (US)

( * ) Notice: Subject to any disclaimer, the term of this patent is extended or adjusted under 35 U.S.C. 154(b) by 1046 days.

(21) Appl. No.: 12/541,130

(22) Filed: Aug. 13, 2009

(65) Prior Publication Data

US 2011/0036066 A1  Feb. 17, 2011

(51) Int. Cl.
*F02C 3/00* (2006.01)
*F02C 6/18* (2006.01)

(52) U.S. Cl.
USPC .................................. 60/39.182; 60/39.5

(58) Field of Classification Search
USPC ................. 60/39.182, 39.5; 422/168, 176, 422/177
See application file for complete search history.

(56) References Cited

U.S. PATENT DOCUMENTS

| | | | | |
|---|---|---|---|---|
| 3,151,701 A * | 10/1964 | Duthion et al. | ............... | 181/217 |
| 4,131,432 A * | 12/1978 | Sato et al. | ...................... | 60/39.5 |
| 4,950,473 A * | 8/1990 | Flockenhaus et al. | ........ | 423/235 |
| 5,380,088 A * | 1/1995 | Fleischli et al. | ........... | 366/162.1 |
| 5,380,499 A * | 1/1995 | MacInnis | ...................... | 422/177 |
| 5,461,853 A * | 10/1995 | Vetterick | ................... | 60/39.182 |
| 5,555,718 A | 9/1996 | Anderson et al. | | |
| 5,558,047 A * | 9/1996 | Vetterick | ......................... | 432/29 |
| 5,946,901 A * | 9/1999 | Bauver et al. | .................. | 60/39.5 |
| 6,298,655 B1 * | 10/2001 | Lee et al. | ......................... | 60/39.5 |
| 7,069,716 B1 | 7/2006 | Childers | | |
| 7,523,602 B2 | 4/2009 | Patel et al. | | |
| 7,638,107 B1 * | 12/2009 | Wirt et al. | ..................... | 422/177 |
| 8,186,152 B2 | 5/2012 | Zhang et al. | | |
| 2001/0035136 A1* | 11/2001 | Shimada et al. | .......... | 60/39.182 |
| 2005/0051112 A1* | 3/2005 | Van Berlo | ...................... | 122/466 |
| 2008/0022907 A1* | 1/2008 | Varner | ........................... | 423/177 |
| 2010/0011738 A1 | 1/2010 | Zhang | | |

* cited by examiner

*Primary Examiner* — Ted Kim
(74) *Attorney, Agent, or Firm* — Fletcher Yoder, P.C.

(57) ABSTRACT

A system, in one embodiment, includes an air injection system comprising a plurality of air injection tubes having a staggered arrangement, wherein each of the plurality of air injection tubes is configured to inject air into an exhaust duct.

21 Claims, 8 Drawing Sheets

SYSTEM AND METHOD FOR INJECTION OF COOLING AIR INTO EXHAUST GAS FLOW

BACKGROUND OF THE INVENTION

The subject matter disclosed herein relates to turbine systems and, more specifically, to systems and methods for injecting cooling air into exhaust gas flow(s) produced by such turbine systems.

Gas turbine systems typically include at least one gas turbine engine having a compressor, a combustor, and a turbine. The combustor is configured to combust a mixture of fuel and compressed air to generate hot combustion gases, which, in turn, drive blades of the turbine. Exhaust gas produced by the gas turbine engine may include certain byproducts, such as nitrogen oxides ($NO_x$), sulfur oxides ($SO_x$), carbon oxides ($CO_x$), and unburned hydrocarbons. In general, it is desirable to eliminate or substantially reduce the amount of such byproducts in the exhaust gas prior to releasing the exhaust gas into the atmosphere.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes an air injection system. The air injection system includes a plurality of air injection tubes having a staggered arrangement. Each of the plurality of air injection tubes may be configured to inject air into a turbine exhaust duct.

In another embodiment, a system includes an exhaust processing system. The exhaust processing system includes a plurality of air injection tubes, each being perforated with a plurality of holes. Each of the plurality of air injection tubes may include one or more of varying tube diameters, varying hole diameters, varying hole spacings, or a combination thereof.

In yet a further embodiment, a system includes a manifold configured to receive a flow of cooling air and to distribute the cooling air to a plurality of tubes, wherein the plurality of tubes is configured to provide a non-uniform distribution of the cooling air into a turbine exhaust duct.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
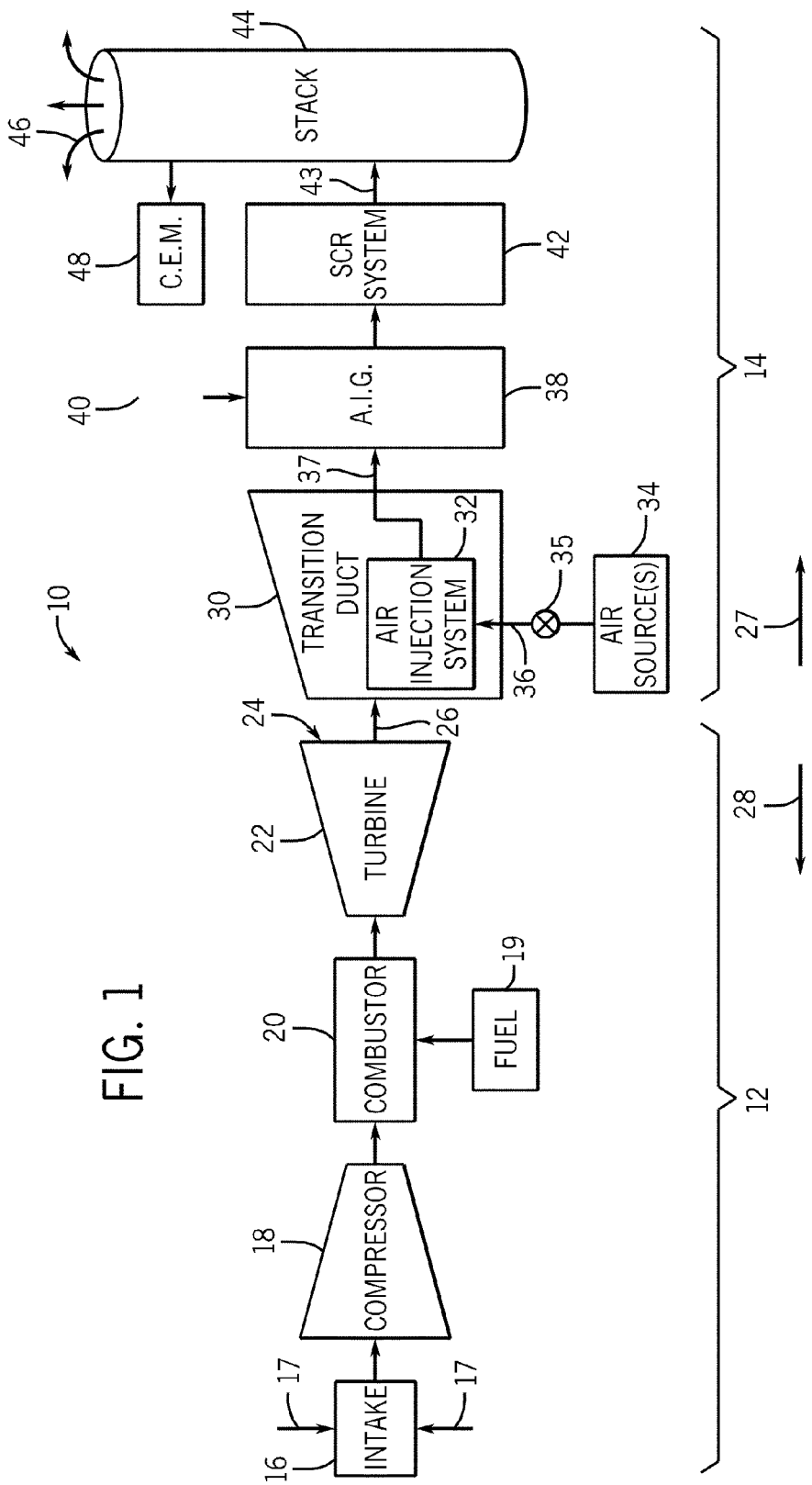
FIG. 1 is a block diagram of a turbine system that includes an air injection system for cooling exhaust gases, in accordance with an embodiment of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment" or "an embodiment" of the present invention are not intended to be interpreted as excluding the existence of additional embodiments that also incorporate the recited features.

Embodiments of the present invention generally relate to techniques for cooling or tempering an exhaust gas flow. For instance, in gas turbine systems, one or more gas turbine engines may combust a fuel to produce combustion gases for driving one or more turbine blades. Depending on the type of fuel that is combusted, emissions (e.g., exhaust gases) resulting from the combustion process may include nitrogen oxides ($NO_x$), sulfur oxides ($SO_x$), carbon oxides ($CO_x$), and unburned hydrocarbons. Often, the composition of exhaust gases released by gas turbine systems, such as a gas turbine power generation plant, is subject to stringent regulatory requirements. By way of example only, regulations may require that the $NO_x$ composition of the exhaust gas that is released into the atmosphere is no greater than 3 parts-per-million (ppm).

One technique for removing or reducing the amount of $NO_x$ in an exhaust gas stream is by Selective Catalytic Reduction (SCR). In an SCR process, a reagent, such as ammonia ($NH_3$) is injected into the exhaust gas stream and reacts with the $NO_x$ to produce nitrogen ($N_2$) and water ($H_2O$). The effectiveness of the SCR process may be at least partially dependent upon the temperature of the exhaust gas that is processed. For instance, the SCR process for removing $NO_x$ may be particularly effective at temperatures of approximately 700 to 900 degrees Fahrenheit (F.°). Thus, where the exhaust gas output from the turbine engine is higher than the effective temperature range for SCR, it may be beneficial to cool the exhaust gases prior to SCR in order to increase the effectiveness of the SCR process (e.g., removal of $NO_x$) in order to meet regulatory standards.

As such, in accordance with embodiments of the present invention, a gas turbine system, such as a simple cycle heavy-duty gas turbine system, may include an air injection system configured to inject cooling air into an exhaust gas stream. As will be described further below, the air injection system may be disposed downstream (i.e., relative to the flow of exhaust gases) of a turbine, but upstream from an SCR system. The air injection system may include a plurality of air injection tubes, each having a plurality of air injection holes or openings for injecting cooling air into the exhaust gas stream. In certain embodiments, one or more manifolds may be provided to receive the cooling air, which may be supplied by any suitable cooling air source, such as an air blower, and to distribute the cooling air to each of the air injection tubes of the air injection system. Additionally, the cooling air could be supplied from the compressor. Regardless of the cooling air source, it should be understood that the cooling air may be ambient air, or may be cool, i.e., via a heat exchanger, prior to injection into the transition duct. Depending on the particular desired profile of the exhaust gas, the air injection tubes may be of varying sizes, and may be arranged in a staggered configuration. Additionally, the air injection holes on each of the air injection tubes may utilize a variety of size and spacing configurations, in accordance with several embodiments that will be described further below. In other words, the air injection tubes may be tuned to provide a generally non-uniform distribution of cooling air (e.g., determined by air injection hole or tube characteristics) into the turbine exhaust duct. In accordance with these presently disclosed techniques, the injection of cooling air into the exhaust gas stream by the air injection system may provide for improved uniformity in temperature and/or velocity distributions of the cooled exhaust gas received by the SCR system, reduced gas turbine backpressure, and enhanced flow distribution, among other advantages. Further, while the presently disclosed techniques may be particularly useful in simple cycle heavy-duty gas turbine systems, as will be discussed below, it should be understood that the present technique may be implemented in any suitably configured system, including combined cycle gas turbine systems, for example.

With the foregoing in mind, FIG. 1 is a block diagram of an exemplary turbine system 10 that includes a gas turbine engine 12 and an exhaust processing system 14. In certain embodiments, the turbine system 10 may be a power generation system. The turbine system 10 may use liquid or gas fuel, such as natural gas and/or a hydrogen-rich synthetic gas, to run the turbine system 10.

As shown, the gas turbine engine 12 includes an air intake section 16, a compressor 18, a combustor section 20, and a turbine 22. The turbine 20 may be drivingly coupled to the compressor 18 via a shaft. In operation, air enters the turbine engine 12 through the air intake section 16 (indicated by the arrows 17) and is pressurized in the compressor 18. The compressor 18 may include a plurality of compressor blades coupled to the shaft. The rotation of the shaft causes rotation of the compressor blades, thereby drawing air into the compressor 18 and compressing the air prior to entry into the combustor section 20.

The combustor section 20 may include one or more combustors. In one embodiment, a plurality of combustors may be disposed at multiple circumferential positions in a generally circular or annular configuration about the shaft. As compressed air exits the compressor 18 and enters the combustor section 20, the compressed air may be mixed with fuel 19 for combustion within the combustor(s). For example, the combustor(s) may include one or more fuel nozzles that may inject a fuel-air mixture into the combustor(s) in a suitable ratio for optimal combustion, emissions, fuel consumption, power output, and so forth. The combustion of the air and fuel may generate hot pressurized exhaust gases, which may then be utilized to drive one or more turbine blades within the turbine 22. In operation, the combustion gases flowing into and through the turbine 22 flow against and between the turbine blades, thereby driving the turbine blades and, thus, the shaft into rotation to drive a load, such as an electrical generator in a power plant. As discussed above, the rotation of the shaft also causes blades within the compressor 18 to draw in and pressurize the air received by the intake 16.

The combustion gases that flow through the turbine 22 may exit the downstream end 24 of the turbine 22 as a stream of exhaust gas 26. The exhaust gas stream 26 may continue to flow in the downstream direction 27 towards the exhaust processing system 14. For instance, the downstream end 24 may be fluidly coupled to the exhaust processing system 14 and, particularly, to a transition duct 30. As discussed above, as a result of the combustion process, the exhaust gas 26 may include certain byproducts, such as nitrogen oxides ($NO_x$), sulfur oxides ($SO_x$), carbon oxides ($CO_x$), and unburned hydrocarbons. Due to certain regulatory requirements, the exhaust processing system 14 may be employed to reduce or substantially minimize the concentration of such byproducts prior to releasing the exhaust gas stream into the atmosphere.

As mentioned above, one technique for removing or reducing the amount of $NO_x$ in an exhaust gas stream is by using a Selective Catalytic Reduction (SCR) process. For example, in an SCR process for removing $NO_x$ from the exhaust gas stream 26, ammonia ($NH_3$) is injected into the exhaust gas stream and reacts with the $NO_x$ to produce nitrogen ($N_2$) and water ($H_2O$). As will be appreciated, the effectiveness of this SCR process may be at least partially dependent upon the temperature of the exhaust gas that is processed. For instance, the SCR process for removing $NO_x$ may be particularly effective at temperatures of approximately 700 to 900 degrees Fahrenheit (° F.). In certain embodiments, however, the exhaust gas 26 exiting the turbine 22 and entering the transition duct 30 may have a temperature of approximately 1000 to 1500 degrees F.° or, more specifically, 1100 to 1200 degrees F°. Accordingly, to increase the effectiveness of the SCR process for $NO_x$ removal, the exhaust processing system 14 may include an air injection system 32 configured to inject cooling air into the exhaust gas stream 26, thereby cooling the exhaust gas stream 26 prior to SCR. It should be understood that the effective temperatures may vary depending on the element being removed from the gas stream 26 and/or the catalyst being employed.

As shown in FIG. 1, the air injection system 32 may be disposed within the transition duct 30. In one embodiment, the air injection system 32 may include a plurality of air injection tubes. Each of the air injection tubes may include a plurality of air injection holes configured to inject cooling air 36 provided by one or more air sources 34 into the transition duct 30 for mixture with the exhaust gas stream 26. For instance, in one embodiment, the air source(s) may include one or more air blowers, compressors (e.g., compressor 18), heat exchangers, or a combination thereof. As will be appreciated, the term "cooling," when used to describe the air flow 36, should be understood to mean that the air 36 is cooler relative to the exhaust gas stream 26 exiting the turbine 22. For example, the cooling air 36 supplied by the air source(s) 34 may be ambient air, or may be further cooled using a heat exchanger or other type of suitable cooling mechanism. The air injection system 32 may also include a valve 35 for regulating the flow of cooling air 36. By way of example only, in one embodiment, the exhaust gas 26 output from the turbine 22 may flow into the transition duct 30 at a rate of approximately 1000 pounds/second, and cooling air 36 may be injected into the transition duct 30 (via the air injection system 32) at a rate of approximately 500 pounds/second. It should be understood, however, that the flow rate of exhaust gas 26 and the flow rate of the cooling air 36 may vary. The cooling air 36 mixes with the exhaust gas stream 26 in order to achieve a cooled exhaust gas stream, referred to by reference number 37 which, as discussed above, may have a temperature of approximately 700 to 900 degrees ° F., i.e., suitable for increasing or substantially maximizing $NO_x$ removal in the SCR process. As will be discussed further below, the configuration of the air injection holes, as well as the diameters of the air injection tubes, may be suitably configured to provide generally uniform mixing, thus achieving a generally uniform temperature and velocity distribution in the cooled exhausted gas 37 prior to downstream SCR processing.

Referring still to FIG. 1, the cooled exhaust gas stream 37 may continue flowing downstream (e.g., in direction 27) through an ammonia injection grid 38. The ammonia injection grid 38 may be configured to inject ammonia ($NH_3$) 40 into the cooled exhaust gas stream 37. In one embodiment, the ammonia injection grid 38 may include a network of pipes with openings for injecting ammonia 40 into the cooled exhaust gas stream 37. Further downstream, an SCR system 42 may be implemented using any suitable geometry, such as a honeycomb or plate configuration. Within the SCR system 42, the ammonia 40 essentially acts as a catalyst and reacts with the $NO_x$ in the exhaust gas stream 37 to produce nitrogen ($N_2$) and water ($H_2O$), thus removing $NO_x$ from the exhaust gas 37 prior to release into the atmosphere through the stack 44, as indicated by the flow arrows 46. The stack 44, in some embodiments, may include a silencer or muffler. By way of example and depending on current regulatory standards, the exhaust processing system 14 may utilize the air injection system 32 and the SCR system 42 to reduce the composition of $NO_x$ in the processed exhaust gas stream, referred to by reference number 43, to approximately 3 ppm or less. In another embodiment, atomized water may be mixed with cooling air, and the water-air mixture may be injected into the transition duct 30 to lower exhaust gas temperature.

While the present embodiment is generally focused on the processing and removal of $NO_x$ from the exhaust gas stream 26, other embodiments may provide for the removal of other combustion byproducts, such as carbon monoxide or unburned hydrocarbons. As such, the supplied catalyst may vary depending on the composition that is being removed from the exhaust gas stream 26. Additionally, it should be understood that the embodiments disclosed herein are not limited to the use of one SCR system 42, but may also included multiple SCR systems 42. Still further, the system 10 may also include a continuous emissions monitoring (CEM) system 48 that continuously monitors the composition of the processed exhaust stream 43 exiting the stack 44. If the CEM system 48 detects that the composition of processed exhaust stream 43 fails to comply with one or more regulatory requirements, the CEM system 48 may provide notification to an appropriate regulatory entity (e.g., Environmental Protection Agency), which may be tasked with instigating further action, such as notifying the operators of the system 10 to adjust operating parameters, perform service, or otherwise cease operating the system 10 until it can be determined that the processed exhaust stream 43 produced by the system 10 conforms with the regulatory requirements. In some embodiments, the CEM system 48 may also implement corrective actions, such as adjusting temperature, flow rates of cooling air 36, an amount of $NH_3$ injected into duct 30, etc.

Figure 2:
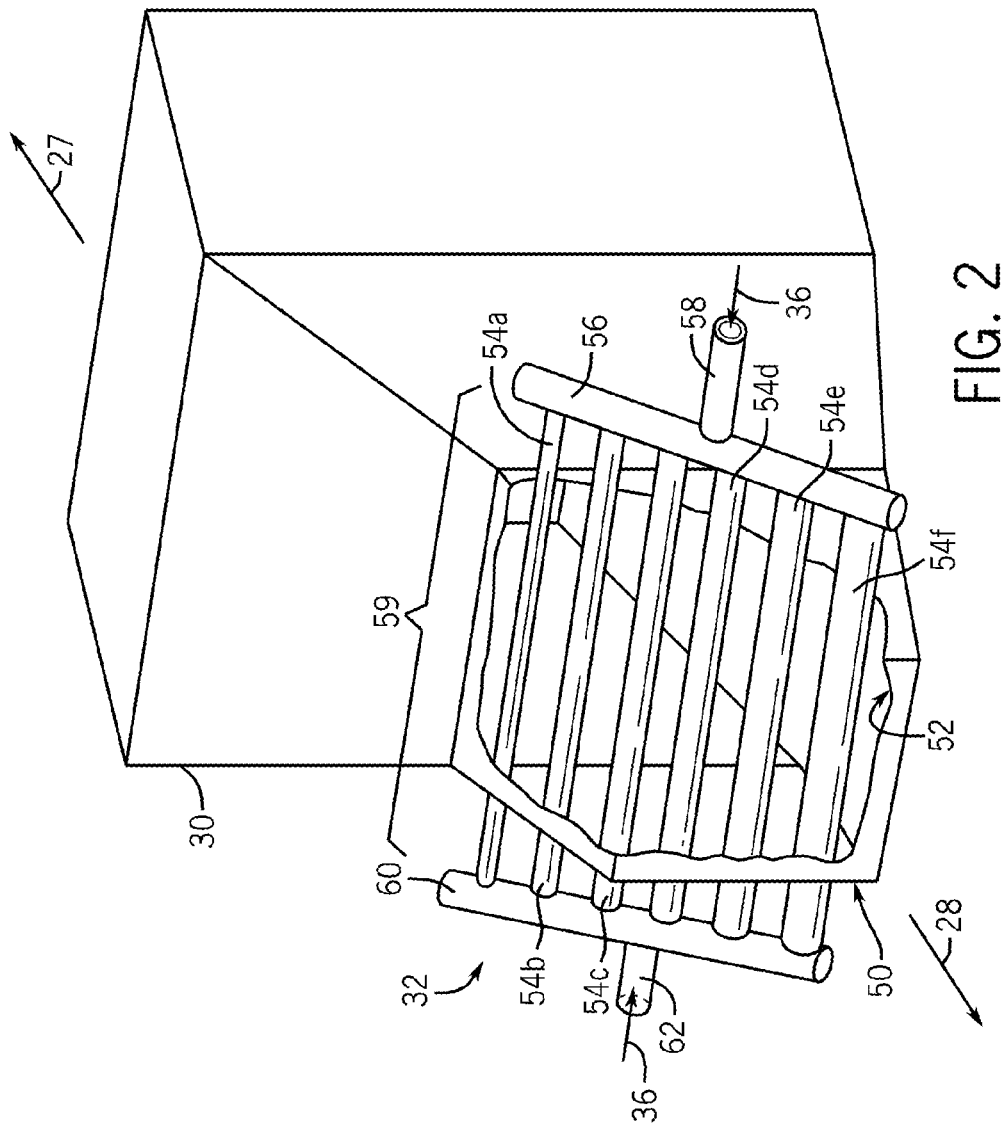
FIG. 2 is a perspective partial cutaway view of a transition duct, as shown in FIG. 1, that includes the air injection system having a plurality of air injection tubes, in accordance with an embodiment of the present technique.

Referring now to FIG. 2, a partial perspective cutaway view of the transition duct 30 is illustrated, in accordance with one embodiment. The upstream end 50 of the transition duct 30 may include an opening 52 that fluidly couples the transition duct 30 to the turbine 22 to receive the exhaust gas flow 26. FIG. 2 additionally illustrates an embodiment of the air injection system 32 at least partially disposed within the transition duct 30. The air injection system 32 may include a plurality of air injection tubes 54a-54f arranged in a staggered configuration (e.g., progressively different vertical and horizontal positions). The air injection tubes 54a-54f may be configured to receive a flow of cooling air 36 and to inject the cooling air 36 into the transition duct 30 for mixture with the exhaust gas stream 26. For instance, in the illustrated embodiment, the downstream-facing end (e.g., facing the downstream direction 27) of each of the air injection tubes 54a-54f may include an arrangement of air injection holes. Additionally, while the presently illustrated air injection system 32 is shown as having six air injection tubes 54a-54f, it should be appreciated that in other embodiments, the air injection system 32 may have fewer or more tubes, e.g., 2 to 100 tubes or more. For instance, the air injection system 32 may include 8, 10, 12, 14, 16, or more tubes.

As shown in FIG. 2, a first air injection manifold, referred to by reference number 56, is coupled to a first end of each of the air injection tubes 54a-54f. The air injection manifold 56 may include an inlet 58, which may be fluidly coupled to the air source 34 that provides the flow of cooling air 36. As discussed above, the cooling air 36 may be provided as ambient air (e.g., by an air blower or compressor), or may be cooled via, for example, a heat exchanger. Accordingly, the manifold 56 may be configured to receive the cooling air 36 via the inlet 58, and to further distribute the cooling air 36 to each of the air injection tubes 54a-54f. The cooling air 36 may then be injected into the transition duct 30 for mixture with the exhaust gas stream 26 via the air injection holes on each of the air injection tubes 54a-54f. Though not visible in the presently illustrated view, it should be appreciated that the size and spacing of the air injection holes on each of the air injection tubes 54a-54f may be configured to provide for generally uniform temperature and/or velocity distributions of the cooled exhaust gas 37. For instance, the air injection holes may be the same size and/or may be evenly distributed across the length 59 of the air injection tubes 54a-54f, or may also vary in size and/or distribution. Additionally, the size (e.g., diameter) and/or length 59 of the air injection tubes 54a-54f themselves may vary or be the same. In doing so, flow distribution may be improved within the transition duct 30, thus reducing backpressure in the gas turbine system 10. Several embodiments showing various configurations of the air injection holes and the air injection tubes 54a-54f will be illustrated further below with reference to FIGS. 4-8.

In the illustrated embodiment, the air injection system 32 also includes a second air injection manifold 60 coupled to a second end of each of the air injection tubes 54a-54f. The air injection manifold 60 may include an inlet 62, which may be similar to the inlet 58 on the air injection manifold 56. Thus, the air injection manifold 60 may receive the cooling air 36 and distribute the cooling air 36 to each of the air injection tubes 54a-54f. As discussed above, air injection holes on each of the air injection tubes 54a-54f may be configured to inject the cooling air 36 into the transition duct 30 for mixture with the exhaust gas stream 26. In other words, the air injection system 32, in some embodiments, may include multiple manifolds (e.g., 56 and 60) to provide a cooling air flow 36 to both ends of each air injection tube 54a-54f. Each manifold 56 and 60 may be fluidly coupled to the same air source 34, or to separate respective air sources 34 (in which case, the cooling air 36 received via inlets 58 and 62 may be provided by discrete air sources). Still further, in other embodiments, the air injection system 32 may include only a single manifold (e.g., 56). Additionally, while the present embodiment illustrates the manifolds 56 and 60 as being external to the transition duct 30, the manifolds 56 and 60, in other embodiments, may also be disposed within the transition duct 30.

Figure 3:
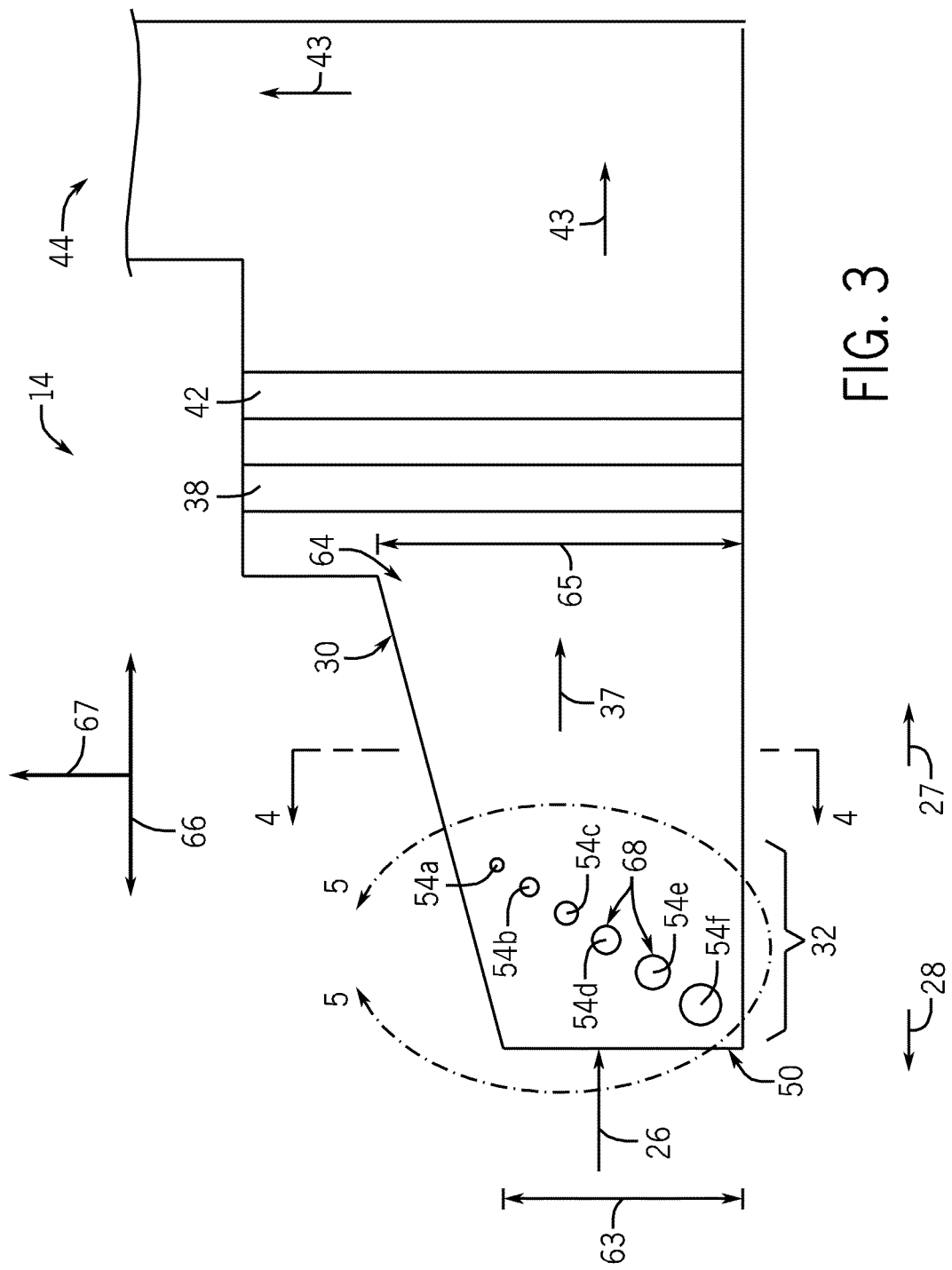
FIG. 3 is a cutaway side view of the transition duct including the air injection system having the plurality of air injection tubes, as shown in FIG. 2, in accordance with an embodiment of the present technique.

FIG. 3 shows a cutaway side view of the transition duct 30 that includes the air injection system 32 having the plurality of air injection tubes 54a-54f, as shown in FIG. 2. The transition duct 30 generally expands in the downstream direction 27. For instance, the upstream end 50 of the transition duct 30 may have a height 63 of between approximately 10 to 20 feet or, more specifically, approximately 12 to 18 feet, or even more specifically, approximately 14 to 15 feet. An opposite downstream end 64 of the transition duct 30 may have a height 65 of between approximately 25 to 100 feet or, more specifically, 25 to 60 feet. As discussed above, the air injection tubes 54a-54f may be arranged (e.g., coupled to the manifold(s) 56 and/or 60) in a staggered configuration. For instance, as shown in FIG. 3, the air injection tubes 54a-54f are arranged such that each tube is offset in an x-direction 66 and a y-direction 67 of the exhaust processing system 14 with respect to every other tube. That is, each of the air injection tubes 54a-54f has a different position along the x-axis 66 and the y-axis 67 of the exhaust processing system 14. Also, the spacing between each of the tubes 54a-54f could be equal or different, i.e., could get spaced progressively further apart. Further, based on the how the width of the transition duct 30 changes along the x-axis and/or y-axis, the lengths 59 of each air injection tube 54a-54f may vary.

As discussed above, each of the air injection tubes 54a-54f may include a plurality of air injection holes arranged on a downstream-facing end 68 (e.g., in the direction 27). The air injection holes may be configured to inject the cooling air 36 received by each of the air injection tubes 54a-54f into the transition duct 30 for mixture with the exhaust gas stream 26 to produce the cooled exhaust gas stream 37. Subsequently, a catalyst, such as ammonia ($NH_3$) may be introduced into the cooled exhaust gas stream 37 by the ammonia injection grid 38, and the SCR system 42 may be configured to reduce the composition of $NO_x$ in the processed exhaust gas stream via selective catalyst reduction, thereby reducing the amount of $NO_x$ in the processed exhaust gas stream 43 that exits the exhaust processing system 14 via the stack 44. For instance, in accordance with certain regulatory requirements, the processed exhaust gas stream 43 may have a $NO_x$ composition of 3 ppm or less. Again, it should be kept in mind that while the presently illustrated embodiments are generally focused on the processing and removal of $NO_x$ from the exhaust gas stream 26, other embodiments of the exhaust processing system 14 may provide for the removal of other unwanted combustion byproducts, such as sulfur oxides ($SO_x$), carbon oxides ($CO_x$), and unburned hydrocarbons.

As mentioned above, the air injection tubes 54a-54f of the air injection system 32 may be configured in a variety of different manners depending on the particular characteristics of the exhaust gas stream 26 for a given application. Generally, the configuration of the air injection tubes 54a-54f is selected to provide for generally uniform temperature and/or velocity distributions of the cooled exhaust gas 37, as well as improved flow distribution, prior to SCR processing by the SCR system 42. By way of example, the length and size (e.g., diameter) of the air injection tubes 54a-54f may vary, and the size and spacing of the air injection holes on each of the air injection tubes 54a-54f may also vary.

Figure 4:
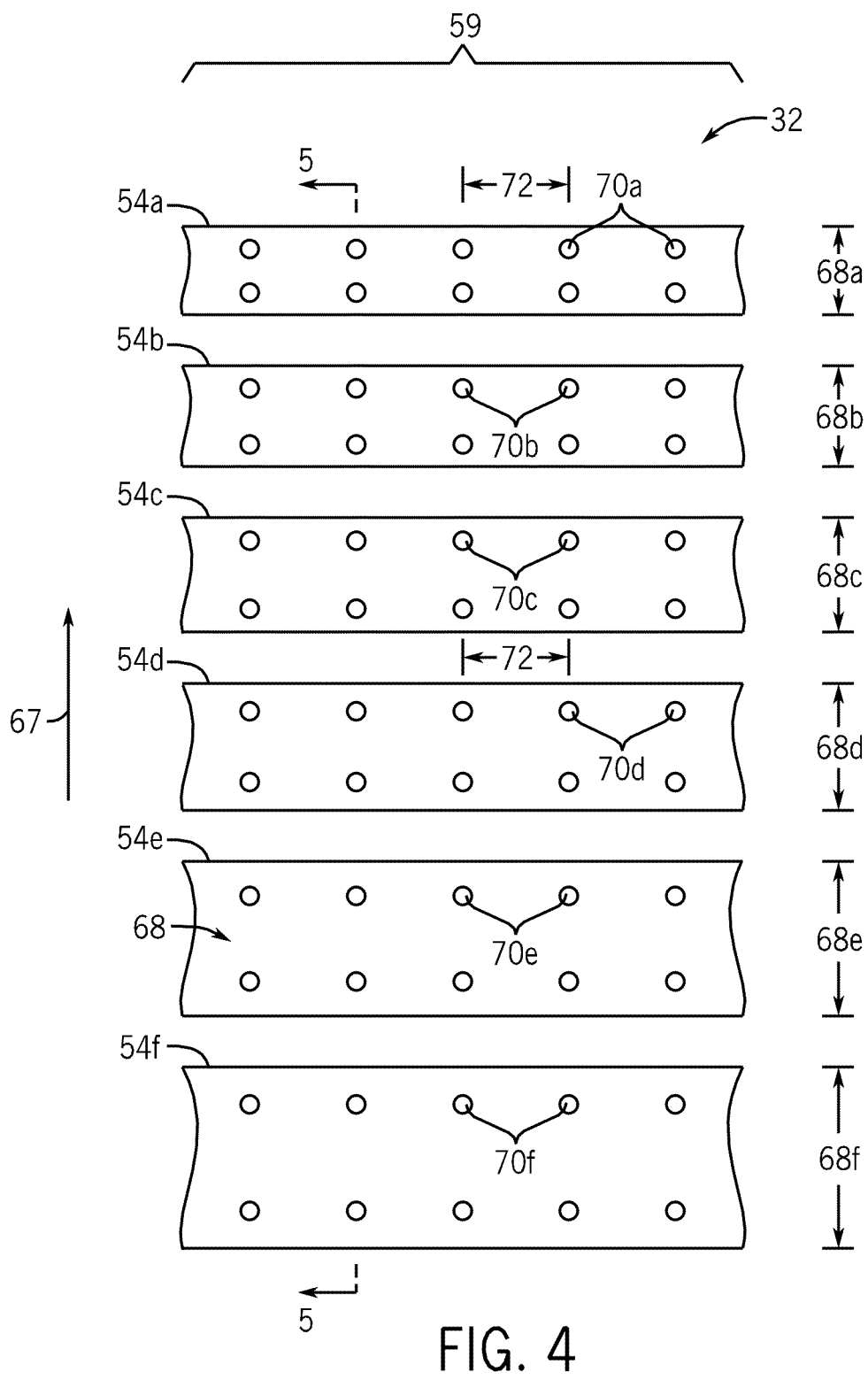
FIG. 4 is a partial cross-sectional end view of the transition duct taken along cut-line 4-4 of FIG. 3, further illustrating a plurality of air injection holes on each of the air injection tubes, in accordance with an embodiment of the present technique.

For instance, referring to FIG. 4, a partial cross-sectional end view of the transition duct 30 taken along cut-line 4-4 of FIG. 3 is shown and illustrates the air injection tubes 54a-54f when viewed facing the upstream direction 28 (FIG. 3). In the presently illustrated embodiment, each of the air injection tubes 54a-54b may have different diameters, represented by reference numbers 68a-68f, respectively. The diameters 68a-68f may generally decrease as the position of its respective tube 54a-54f increases in the positive direction along the y-axis 67. For example, the diameter 68f (tube 54f) may be greater than the diameter 68e (tube 54e), which may be greater than diameter 68d (tube 54d), which may be greater than diameter 68c (tube 54c), and so forth. In one embodiment, the air injection tubes 54a-54f may include diameters ranging from approximately 1 to 50 inches or, more specifically, 10 to 30 inches or, even more specifically, 12 inches to 24 inches. For instance, the diameter 68a of tube 54a may be approximately 12 inches, while the diameter 68f of tube 54f may be approximately 24 inches, with each of the diameters 68b, 68c, 68d, and 68e being between 12 and 24 inches, but generally increasing in size (e.g., with diameter 68c being greater than diameter 68b, diameter 68d being greater than diameter 68c, and diameter 68e being greater than diameter 68d). In another embodiment, the diameters 68a-68f may generally increase as the position of its respective tube 54a-54f increases in the positive direction along the y-axis 67. For example, the diameter 68a (tube 54a) could be greater than the diameter 68b (tube 54b), which may be greater than diameter 68c (tube 54c), which may be greater than diameter 68d (tube 54d), and so forth. Additionally, the diameters 68a-68f may progressively increase or decrease in diameter by 1 to 100 percent from one tube to another, e.g., 10, 20, 30, 40, or 50 percent from each tube to the next tube.

Figure 5:
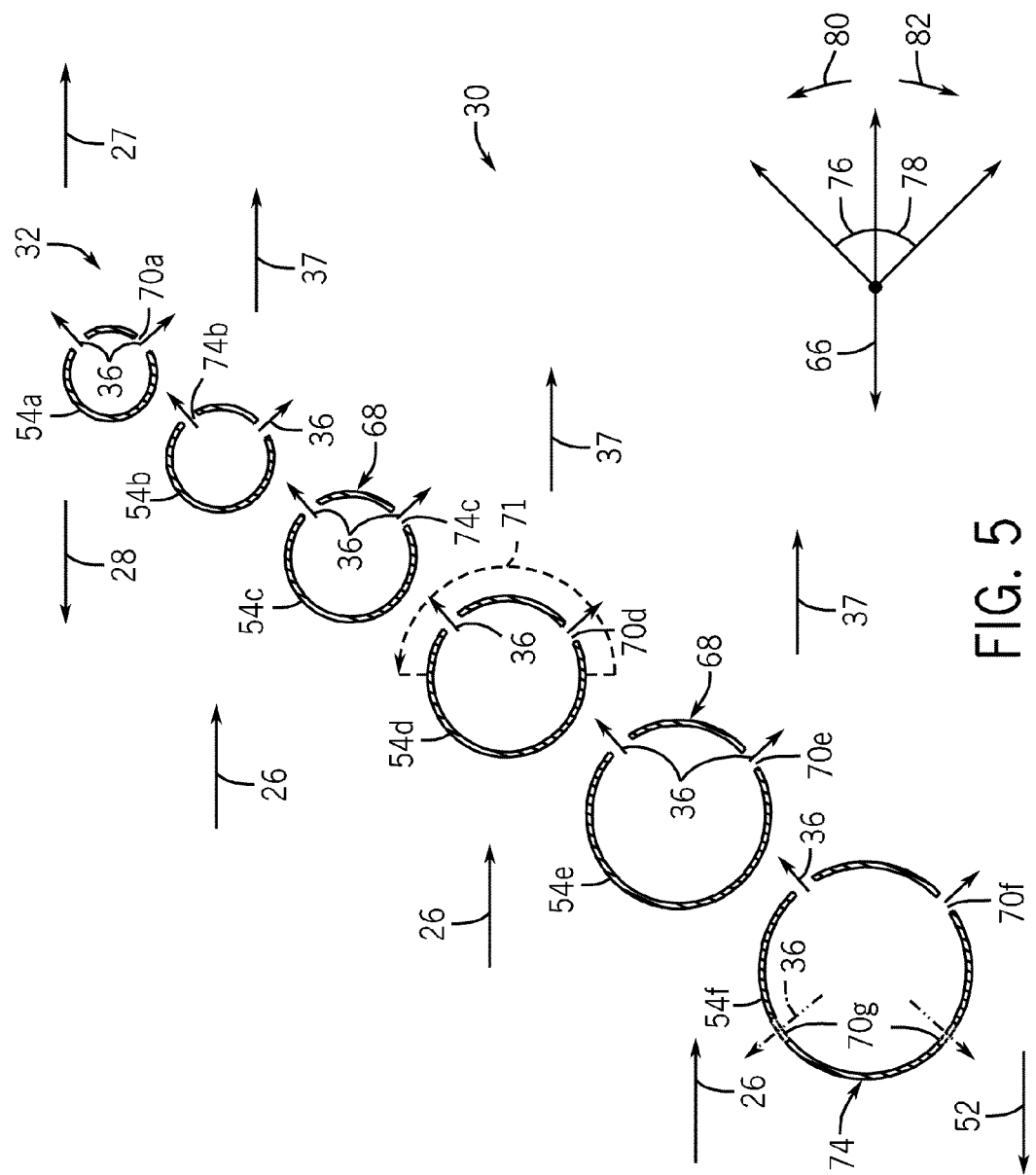
FIG. 5 is a cutaway side view of the air injection tubes taken along cut-line 5-5 of FIG. 4 and within arcuate line 5-5 of FIG. 3, in accordance with an embodiment of the present technique.

Referring still to FIG. 4, each of the air injection tubes 54a-54f may include respective air injections holes 70a-70f arranged on a downstream-facing end 68. As shown in FIG. 5 with reference to tube 54d, the downstream-facing end may be defined as approximately 180 degrees of the surface of the tube that faces in the downstream direction 27 (shown by arc 71). In the illustrated embodiment, the downstream-facing end 68 of each air injection tube 54a-54f may include two rows of air injection holes arranged along the length 59 of each respective air injection tube 54a-54f, though other embodiments may include more rows, e.g., 1 to 20 rows. As discussed above, each of the air injection holes 70a-70f may be configured to inject cooling air 36 into the transition duct 30. In the presently illustrated embodiment, each of the air injection holes 70a-70f may have the same diameter, and the spacing 72 between each of the air injection holes 70a-70f may also be the same. To provide an example, the air injection holes 70a-70f may have a diameter of between approximately 2 to 7 inches or, more specifically, 3 to 6 inches or, even more specifically, 4 to 5 inches. In other embodiments, including those that will be discussed below in FIGS. 6-8, the spacing 72 between each air injection hole 70a-70f and/or the size of the air injection holes 70a-70f themselves may vary. Further, the holes 70a-70f may be defined as function of the diameters 68a-68f, e.g., 1 to 20% of a corresponding diameter.

Continuing to FIG. 5, a cutaway side view of the air injection tubes 54a-54f taken along cut-line 5-5 of FIG. 4 and taken within the region defined by arcuate line 5-5 of FIG. 3, is illustrated. As discussed above and illustrated in the present figure, the air injection tubes 54a-54f are arranged in a staggered manner (e.g., progressively different vertical and horizontal positions), and each of the air injection tubes 54a-54f may be configured to inject cooling air 36 into the transition duct 30 for mixture with the exhaust gas stream 26 to produce the cooled exhaust gas stream 37. The present embodiment may provide for two rows of air injection holes (70a-70f) on each air injection tube (54a-54f). Accordingly, the cooling air 36 may exit the air injection tubes 54a-54f in the generally downstream direction 27, but at two different angles. For instance, the cooling air 36 may exit each of the air injection tubes 54a-54f at a first angle 76, which extends away from the x-axis 66 of the exhaust processing system 14 in the positive direction 80, and at a second angle 78, which extends away from the x-axis 66 of the exhaust processing system 14 in the negative direction 82. By way of example only, the angles 76 and 78 may have magnitudes of between approximately 20 to 70 degrees or, more specifically, between approximately 30 to 60 degrees or, even more specifically, between approximately 40 to 50 degrees. The angles 76 and 78 may have the same or different magnitudes. As will be appreciated, the angles 76 and 78 may vary depending on the particular characteristics of the exhaust gas in given application. For instance, the magnitudes of the angles 76, and 78, in conjunction with the configuration of the air injection holes 70a-70f and the air injection tubes 54a-54f, may be selected to provide for generally uniform temperature and/or velocity distributions of the cooled exhaust gas 37, as well as improved flow distribution, prior to SCR processing by the SCR system 42.

As further shown, particularly with reference to the air injection tube 54f in FIG. 5, some embodiments may also include air injection holes on an upstream-facing end 74 of an air injection tube 54f. In such embodiments, the air injection holes 70g (shown in phantom lines) may be arranged in a similar manner as the air injection holes 70f, but on the upstream-facing end 74. As such, the upstream-facing air injection holes 70g may be configured to inject cooling air 36 into the transition duct 30, such that the cooling air 36 exits the air injection tube 54f in the generally upstream direction 28 for mixture with the exhaust gas stream 26. Additionally, some embodiments may also provide for air injection holes on the top and/or bottom of each tube (e.g., aligned with the y-direction 67). Thus, air injection holes may be disposed in a spaced relationship 360 degrees around each tube, 180 degrees around each tube, or any suitable coverage of each tube. Likewise, the air injection holes may be disposed at any suitable angle about all or part of the circumference of each tube.

Figure 6:
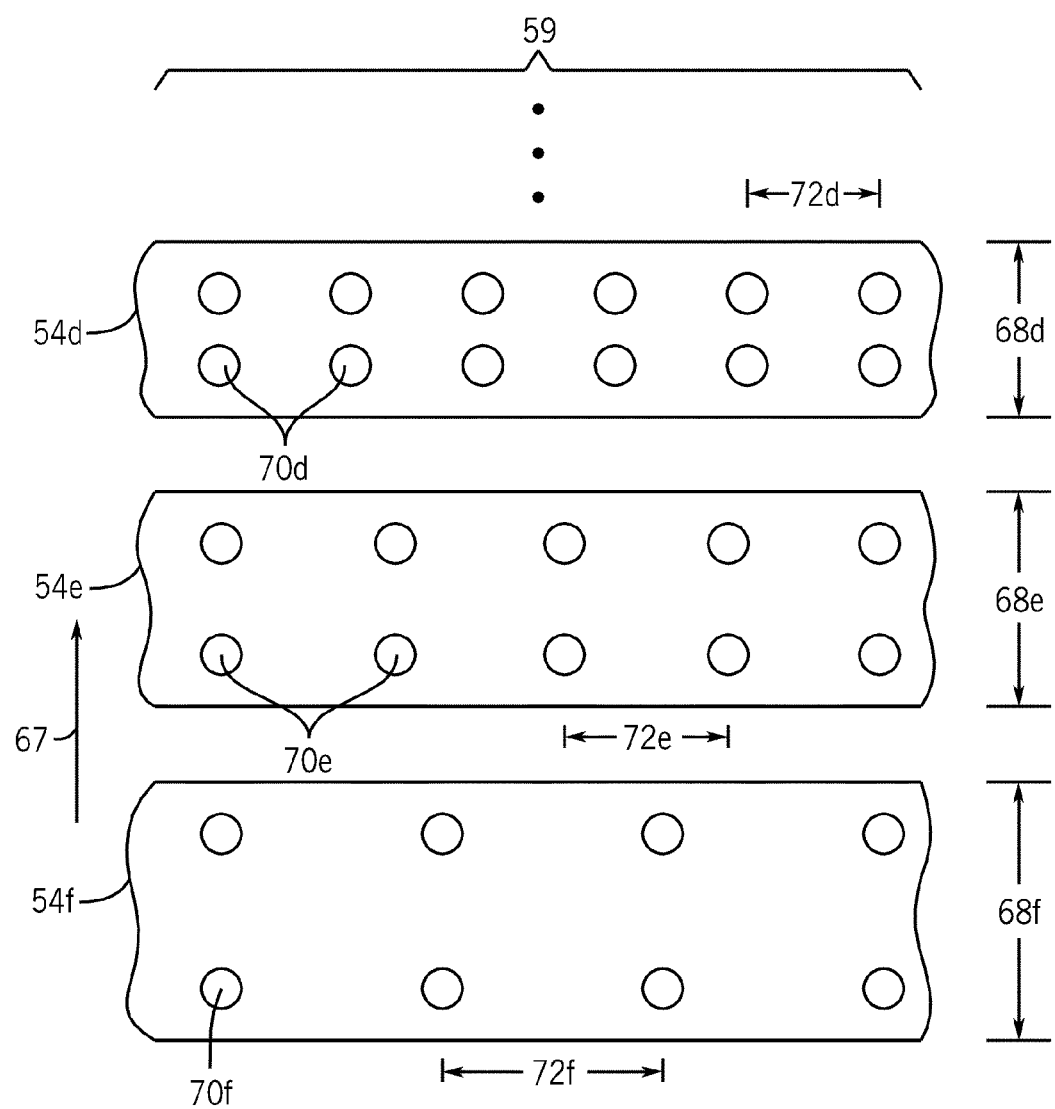
FIG. 6 is a partial cross-sectional end view of the transition duct taken along cut-line 4-4 of FIG. 3, illustrating the air injection tubes in accordance with a further embodiment of the present technique.

Referring now to FIG. 6, a partial cross-sectional end view of the transition duct 30 taken along cut-line 4-4 of FIG. 3 is shown and illustrates a portion of the air injection tubes 54d-54f when viewed facing the upstream direction 28 (FIG. 3). Like the embodiment shown in FIG. 4, the embodiment shown in FIG. 6 may include air injection tubes 54a-54f that vary in diameter (e.g., decrease) as the position of the air injection tube increases in the positive direction along the y-axis 67, and may include air injection holes 70a-70f having generally the same diameter across all of the air injection tubes 54a-54f, although, in other embodiments, the diameters of the air injection holes 70a-70f may also vary. However, the embodiment shown in FIG. 6 differs from the embodiment shown in FIG. 4 in that the spacing 72 between air injection holes 70a-70f may be different along the length 59 of each air injection tube 54a-54f. In particular, the spacing 72 between air injection holes on each air injection tube 54a-54f may vary as the position of each air injection tube 54a-54f increases in the positive direction along the y-axis 67. For instance, the spacing 72f between the air injection holes 70f on the tube 54f may be greater than the spacing 72e between the air injection holes 70e on the tube 54e, and the spacing 72e may be greater than the spacing 72d between the air injection holes 70d on the tube 54d, and so forth. While only the air injection tubes 54d-54f are illustrated in FIG. 6 for simplicity, it should be kept in mind that the spacing 72 may continue to decrease in a similar manner on the air injection tubes 54a-54c. In other words, the present embodiment shows that air injection holes on a particular air injection tube may be closer together relative to air injection holes on air injection tubes below it (e.g. in the negative direction along y-axis 67).

Figure 7:
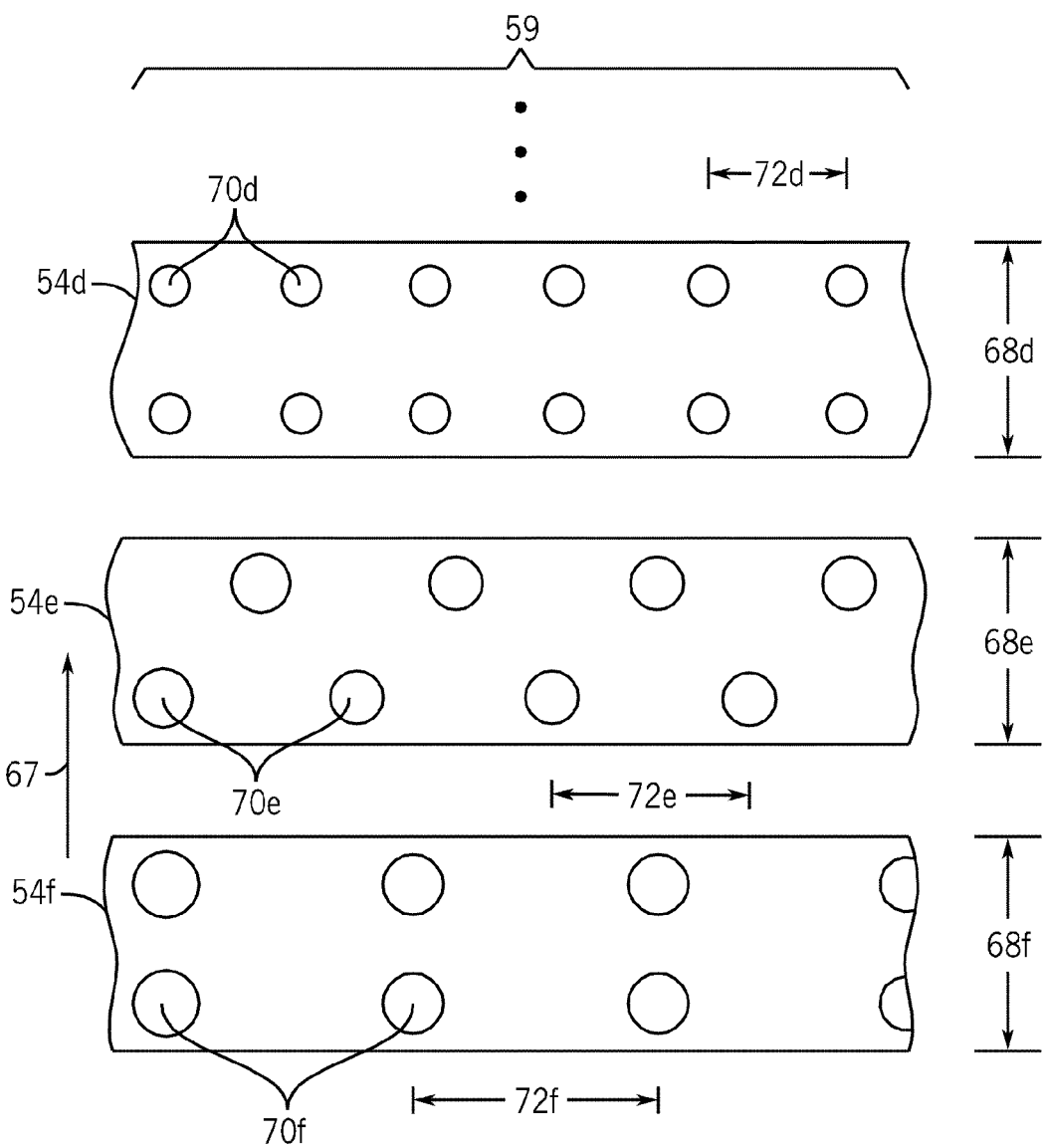
FIG. 7 is a partial cross-sectional end view of the transition duct taken along cut-line 4-4 of FIG. 3, illustrating the air injection tubes in accordance with another embodiment of the present technique.

FIG. 7 shows a further embodiment in which of the air injection tubes 54d-54f of the air injection system 32 are illustrated by way of a partial cross-sectional end view of the transition duct 30 taken along the cut-line 4-4 of FIG. 3. The embodiment shown in FIG. 7 provides a spacing configuration that is similar to the embodiment shown in FIG. 6. That is, the spacing 72a-72f between air injection holes on each air injection tube 54a-54f may vary as the position of the air injection tube 54a-54f increases in the positive direction along the y-axis 67. The embodiment in FIG. 7 differs, however, from the embodiments shown in FIGS. 5 and 6, in that the diameters of the air injection holes 70a-70f vary for each respective air injection tube 54a-54f, and that the diameters for each of the air injection tubes 54a-54f are the same. For instance, the diameters of the holes 70f on the tube 54f may be greater than the diameter of the holes 70e on the tube 54e, and the diameter of the holes 70e may be greater than the diameter of the holes 70d on the tube 54d, and so forth. While only the air injection tubes 54d-54f are illustrated in FIG. 7 for simplicity, it should be kept in mind that the diameters of the holes 70a-70c may continue to decrease in a similar manner with respect to the air injection tubes 54a-54c. In other words, the air injection holes 70a-70f are the same size with respect to other air injection holes on the same air injection tube, but may have a different size with respect to air injection holes on different air injection tubes.

As mentioned above, the diameters of the air injection holes 70a-70f may be between approximately 2 to 7 inches or, more specifically, 3 to 6 inches. To provide one example, the holes 70f may have a diameter of approximately 6 inches, the holes 70e may have a diameter of approximately 5.5 inches, the holes 70d may have a diameter of approximately 5 inches, the holes 70c may have a diameter of approximately 4.5 inches, the holes 70b may have a diameter of approximately 4 inches, and the holes 70a may have a diameter of approximately 3.5 inches. Additionally, while the air injection holes 70a-70f have been shown in the figures as being generally circular in shape, it should be understood that, in further embodiments, the air injection holes 70a-70f could also be square-shaped, diamond-shaped, elliptical-shaped, slot-shaped, or may be configured in other suitable type of geometric configuration. As discussed above, the air injection holes 70a-70f may also be determined as a percentage, e.g. 5 to 20%, of the diameters 68-68f on their respective tubes 54a-54f.

Further, as shown in FIG. 7, the air injection holes (70d and 70f) may be arranged in first and second rows along the length 59 of each tube, such that corresponding air injection holes from the first and second rows are generally aligned with respect to the y-axis 67 (e.g., shown by tubes 54d and 54f). Additionally, with reference to the tube 54e of FIG. 7, the air injection holes 70e may also be arranged such that the holes in the first and second rows are arranged in a staggered pattern. Still further, while the air injection tubes 70a-70f have been described in FIG. 7 as having generally the same diameters 68a-68f, it should be understood the diameters 68a-68f may also vary, such as shown in FIGS. 4 and 6.

Figure 8:
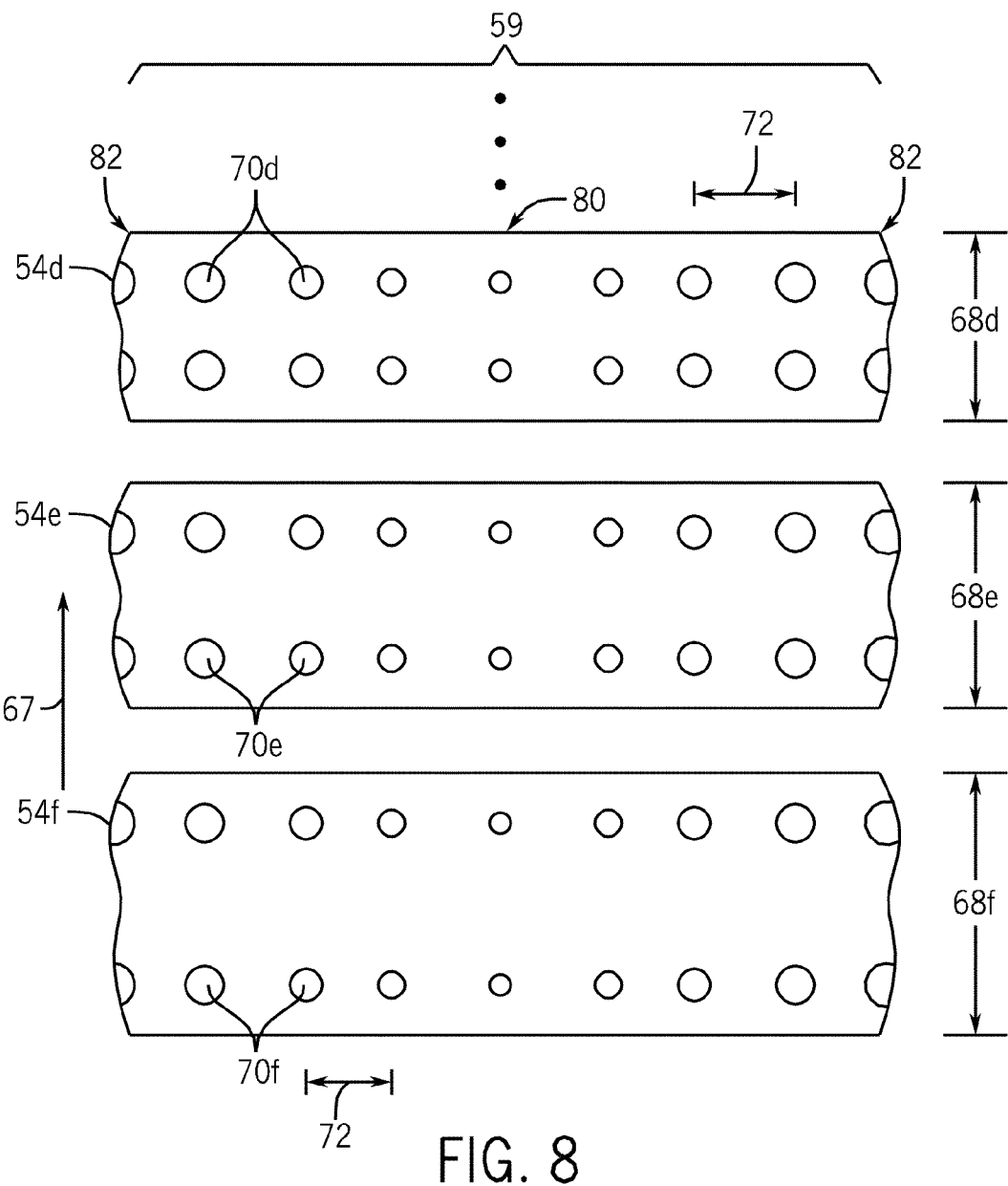
FIG. 8 is a partial cross-sectional end view of the transition duct taken along cut-line 4-4 of FIG. 3, illustrating the air injection tubes in accordance with yet another embodiment of the present technique.

Continuing to FIG. 8, a further embodiment of the air injection system 32 is illustrated by way of a partial cross-sectional end view of the transition duct 30 taken along the cut-line 4-4 of FIG. 3. The embodiment of FIG. 8 is generally similar to the embodiment of FIG. 4, except that the diameters of the air injection holes 70a-70f may vary on each respective air injection tube 54a-54f. For example, as shown on the illustrated air injection tubes 54d-54f, the air injection holes 70d-70f may generally increase in diameter from the center 80 of each air injection tube 54d-54f out towards the ends 82 of each respective tube. In other embodiments, the tube diameters 68a-68f may be same size (e.g., FIG. 7). While only the air injection tubes 54d-54f are illustrated in FIG. 8 for simplicity, it should be understood that the air injections holes 70a-70c on the respective air injection tubes 54a-54c may be arranged in a similar manner. That is, each tube may exhibit the same pattern of inwardly decreasing hole sizes and, in some embodiments, the hole sizes themselves may vary from tube to tube. Further, while the spacing 72 between each of the air injection holes 70a-70f are shown as being generally constant across all of the air injection tubes 54a-54f, it should be understood that the spacing 72 may also differ on each respective air injection tube. For instance, the spacing 72 may be generally constant between air injection holes on one particular air injection tube, but may differ from the spacing between air injection holes on another air injection tube (e.g., like the embodiment shown in FIG. 7). Additionally, the spacing 72, as well may also vary between the air injection holes on the same air injection tube, and the spacing between the tubes 54a-54f themselves may also vary.

As discussed above, the various techniques set forth herein may provide for the injection of cooling air into an exhaust gas stream in order to enhance the uniformity of the temperature and/or velocity distributions of the exhaust gas stream, while also cooling the exhaust gas stream to enhance the effectiveness of a selective catalyst reduction process. For instance, the techniques disclosed herein could cover any combination of constant or varying tube diameters, tube spacings, hole diameters, or hole spacings, or any combination thereof. Again, it should be understood that the disclosed techniques and configurations of the air injection system 32 are intended to be only examples of certain embodiments, and should be construed as being limiting in any way.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
an air injection system comprising a sequence of air injection tubes disposed one after another in a staggered arrangement from a bottom side to an upper side of an exhaust duct of a gas turbine, each tube of the sequence of air injection tubes has a tube diameter along a length of the tube, wherein each tube of the sequence of air injection tubes is configured to inject air into the exhaust duct, the staggered arrangement has the sequence of air injection tubes disposed progressively further away from the bottom side and progressively further downstream relative to a direction of an exhaust flow, and the tube diameters of the sequence of air injection tubes progressively decreases from one tube to another in the direction of the exhaust flow.

2. The system of claim 1, wherein each tube of the sequence of air injection tubes comprises a plurality of air injection holes, and wherein the air is injected into the exhaust duct via the plurality of air injection holes.

3. The system of claim 2, wherein a first spacing between adjacent air injection holes on a first tube of the plurality of air injection tubes is constant, and the spacing is different from a second spacing between adjacent air injection holes on a second tube of the plurality of air injection tubes.

4. The system of claim 2, wherein a spacing between adjacent air injection holes on at least one of the plurality of air injection tubes varies.

5. The system of claim 2, wherein a first diameter of each hole of the plurality of air injection holes on a first tube of the plurality of air injection tubes is constant, and the first diameter is different from a second diameter of each hole of the plurality of air injection holes on a second one of the plurality of air injection tubes.

6. The system of claim 2, wherein a diameter of each hole of the plurality of air injection holes on at least one of the plurality of air injection tubes varies.

7. The system of claim 6, wherein the diameters of the plurality of air injection holes gradually increases in diameter from a center towards an edge of the at least one tube.

8. The system of claim 2, wherein the air injection holes are arranged on the downstream-facing end of each tube of the sequence of air injection tubes.

9. A system, comprising:
an exhaust processing system comprising a sequence of air injection tubes disposed one after another in a staggered arrangement from a bottom side to an upper side of an exhaust duct of a gas turbine, wherein each tube of the sequence of air injection tubes is perforated with a first plurality of holes oriented at a first angle extending in a first direction away from an axis of the exhaust processing system and a second plurality of holes oriented at a second angle extending in a second direction away from the axis, and each tube of the sequence of air injection tubes is configured to inject air into the exhaust duct, the staggered arrangement has the sequence of air injection tubes disposed progressively further away from the bottom side and progressively further downstream relative to a direction of an exhaust flow.

10. The system of claim 9, wherein each tube of the sequence of air injection tubes is coupled to at least one common manifold configured to distribute cooling air to each tube of the sequence of air injection tubes.

11. The system of claim 10, wherein the at least one common manifold comprises a first manifold and a second manifold, wherein the first manifold is coupled to respective first ends of each tube of the sequence of air injection tubes, and wherein the second manifold is coupled to respective second ends of each tube of the sequence of air injection tubes.

12. The system of claim 10, wherein the at least one common manifold comprises an inlet fluidly coupled to an air source, and the air source is configured to provide the cooling air.

13. The system of claim 12, comprising a valve disposed between the inlet and the air source, wherein the valve is configured to regulate a flow rate of the cooling air.

14. The system of claim 9, comprising the exhaust duct having the sequence of air injection tubes disposed in the staggered arrangement within the exhaust duct.

15. The system of claim 9, wherein the exhaust duct comprises a transition duct having the sequence of air injection tubes, wherein the injection of air mixes with the exhaust flow from the gas turbine to improve at least one of temperature uniformity, a velocity uniformity, or a combination thereof, throughout the transition duct.

16. The system of claim 9, comprising the gas turbine coupled to the exhaust duct, wherein the exhaust processing system is configured to reduce backpressure in a gas turbine system.

17. The system of claim 9, wherein the sequence of air injection tubes has one or more of varying hole diameters, varying hole spacings, or a combination thereof.

18. The system of claim 9, wherein the first and second angles are between approximately 20 degrees and approximately 70 degrees.

19. The system of claim 9, wherein each tube of the sequence of air injection tubes has a tube diameter along a length of the tube, and the tube diameters of the sequence of air injection tubes progressively decreases from one tube to another in the direction of the exhaust flow.

20. A system comprising:
a first manifold configured to receive a flow of cooling air at a first inlet and to distribute the cooling air to a sequence of tubes disposed one after another in a staggered arrangement from a bottom side to an upper side of a turbine exhaust duct, each tube of the sequence of tubes has a tube diameter along a length of the tube, the sequence of tube is configured to provide a non-uniform distribution of the cooling air into the turbine exhaust duct, the staggered arrangement has the sequence of tubes disposed progressively further away from the bottom side and progressively further downstream relative to a direction of an exhaust flow, and the tube diameters of the sequence of tubes progressively decreases from one tube to another in the direction of the exhaust flow, wherein the first manifold is disposed on a first side of the turbine exhaust duct; and
a second manifold configured to receive the flow of cooling air at a second inlet and to distribute the cooling air to the plurality of tubes, wherein the second manifold is disposed on a second side of the turbine exhaust duct, and each tube of the plurality of tubes extends through the turbine exhaust duct and couples to the first and second manifolds.

21. The system of claim 20, wherein each tube of the plurality of tubes comprises a plurality of air injection holes having varying diameters.

* * * * *